Feb. 14, 1967  LE ROY D. GORE  3,303,921
SINGLE DRIVE DISPENSING MECHANISM HAVING AUTOMATICALLY
UNFOLDING PRODUCT CONVEYOR SHELVES
Filed Oct. 20, 1965  2 Sheets-Sheet 1

INVENTOR
LeRoy D. Gore

Hovey, Schmidt, Johnson & Hovey
ATTORNEYS

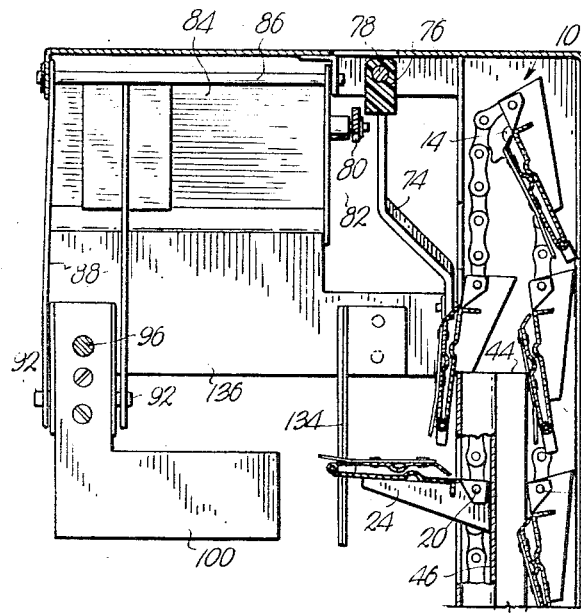
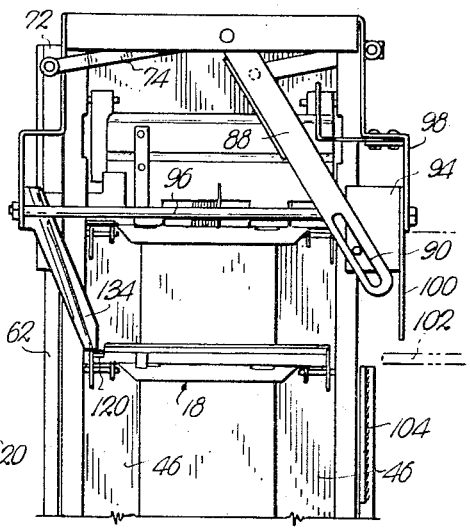
Fig. 4.
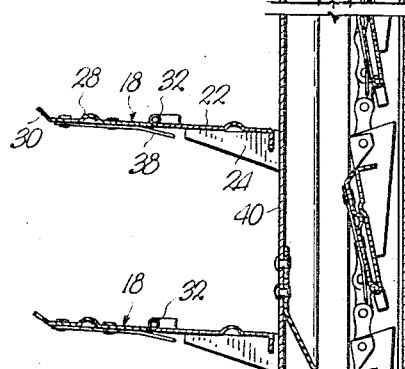
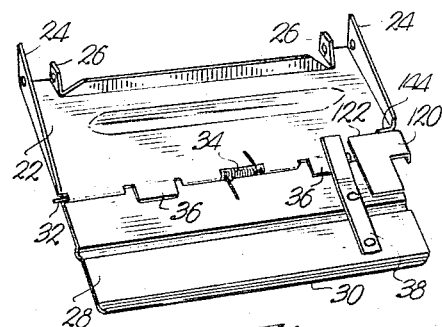
Fig. 5.
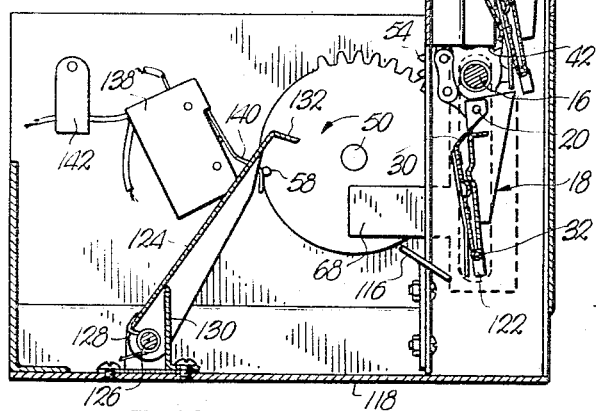
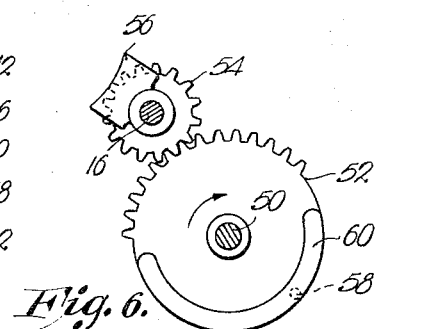
Fig. 3.   Fig. 6.
INVENTOR
LeRoy D. Gore
BY Hovey, Schmidt, Johnson & Hovey
ATTORNEYS

United States Patent Office 3,303,921
Patented Feb. 14, 1967

3,303,921
SINGLE DRIVE DISPENSING MECHANISM HAVING AUTOMATICALLY UNFOLDING PRODUCT CONVEYOR SHELVES
Le Roy D. Gore, Independence, Mo., assignor to The Vendo Company, Kansas City, Mo., a corporation of Missouri
Filed Oct. 20, 1965, Ser. No. 498,880
4 Claims. (Cl. 198—158)

This invention relates to dispensing machines having particular utility in cafeteria applications and, more specifically, to improvements in apparatus of the type disclosed in the copending application of Boley A. Andrews et al., Serial No. 404,094, filed October 15, 1964, and entitled "Automatic Cafeteria Counter."

It is an important object of this invention to provide a product conveyor for a dispensing machine having foldable shelves which are automatically unfolded and refolded during conveyor operation. In the aforesaid copending application, foldable shelves are advantageously provided to conserve space within the cabinet of the machine, but such shelves require manual unfolding during loading thereof with products to be subsequently dispensed.

Another important object of the instant invention is to provide a dispensing mechanism which utilizes a single prime mover to drive both the product conveyor and the pusher that transfers individual products from their shelves to a consumer access station. The employment of a single prime mover, rather than multiple motor drives as in the prior art, results in a substantial reduction of cost and lessens the complexity of the apparatus.

An additional object of the invention is to provide a gate in the path of the product pusher which normally prevents access to the conveyor but opens to permit products to be transferred from the shelves to the access station. When the machine is utilized to dispense refrigerated or heated products, the gate serves to minimize loss of temperature controlled air from the product compartment. Furthermore, utilization of a gate separate from the pusher instead of employing the pusher for such double duty, as in the apparatus of the above-identified copending application, permits a more rugged gate construction, thus affording improved protection against forcible attempts to obtain access to the product compartment.

In the drawings:

FIG. 3 is an enlarged, vertical sectional view taken along line 3—3 of FIG. 2;

FIG. 4 is a fragmentary view similar to FIG. 2 except that the pusher is shown at the right-hand limit of its movement toward the access station;

FIG. 5 is a detailed, perspective view showing the underside of one of the product-receiving, foldable shelves; and FIG. 6 is a detailed view showing the Geneva gear conveyor drive.

Figure 1:
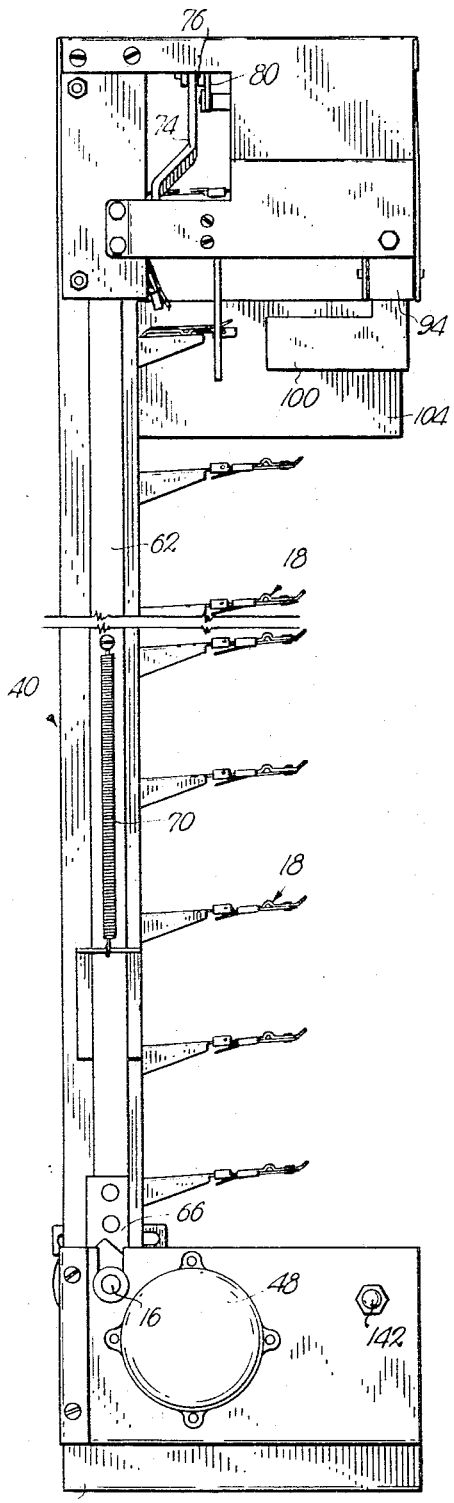
FIGURE 1 is a rear elevational view of the mechanism of the instant invention.

The numeral 10 denotes an upright product conveyor having a pair of endless transport members 12 trained around upper and lower sprocket shafts designated 14 and 16 respectively. Members 12 are in the form of link chains and are engaged by sprockets rigid with shafts 14 and 16, only one of the members 12 being visible in the drawings (FIG. 3).

A plurality of foldable shelves 18 are attached to members 12 by pivot pins 20, two horizontally aligned pins 20 (FIG. 2) being employed to attach each shelf 18 to a particular pair of opposed links of members 12. Each shelf 18 has an inner section 22 having a pair of downturned side flanges 24 and a pair of depending ears 26 apertured to receive pins 20 (FIG. 5).

Each shelf 18 is also provided with an outer section 28 presenting an upturned lip 30 at its outer edge. Hinge pin and barrel structure 32 swingably interconnect the two sections of each shelf, a spring 34 being employed to bias the two sections toward a normally folded disposition illustrated by the two uppermost shelves 18 of the left-hand stretch of conveyor 10 as viewed in FIG. 3, and the shelves of the right-hand stretch of the conveyor.

The edge of each inner section 22 adjacent the respective outer section 28 is provided with a pair of horizontally extending tabs 36 in underlying engagement with the outer section when the shelf is unfolded. The tabs 36 of each shelf support the outer section 28 thereof to hold the two sections of the shelf in horizontal alignment when unfolded. A leaf spring 38 is attached to the underside of outer section 28 and extends into underlying relationship to one of the tabs 36 when the shelf is unfolded. Thus, leaf 38 maintains the shelf in its unfolded position against the bias of spring 34.

An elongated, upright panel 40 is disposed between members 12 and has a lower edge 42 terminating slightly above the axis of rotation of shaft 16, and an upper edge 44 terminating at the upper portion of the apparatus below shaft 14. Panel 40 is configured to form a pair of upright, parallel channels 46 presenting surfaces upon which the inner edges of flanges 24 of the horizontally disposed shelves 18 ride during operation of the conveyor.

Conveyor 10 is driven by a prime mover in the form of an electric motor 48 having an output shaft 50 mounting a Geneva gear 52 thereon. Gear 52 engages a pinion 54 rigid with shaft 16, pinion 54 being provided with a shoe 56 rigid therewith and engageable with locking rib 60 aligned with the untoothed periphery of Geneva gear 52.

A cam in the form of a pin 58 extends from one side of Geneva gear 52 opposite the side having the locking rib 60 thereon. An elongated, upright, longitudinally reciprocable follower member 62 is received by an apertured flange 64 (FIGS. 1 and 2) extending rearwardly from panel 40 and terminates at its lower end in an L-shaped extension 66 having a horizontally extending leg 68 visible in FIG. 3. Leg 68 is disposed for engagement by pin 58 upon rotation of gear 52, a coil spring 70 being connected between flange 64 and member 62 to bias the latter toward the stand-by position shown in FIGS. 1, 2 and 3.

In FIG. 4 the upper end 72 of follower member 62 may be seen pivotally connected to a generally Z-shaped arm 74 which, in turn, is pivotally connected to one end of a block 76 (FIGS. 2 and 3) slidably receiving a horizontal guide rod 78. A link 80 has one of its ends pivotally connected to the opposite end of block 76, the other end of link 80 being pivotally connected to the adjacent side flange 82 of a plate 84 mounted for swinging movement about a horizontal hinge pin 86 (FIG. 3).

Plate 84 is provided with a pair of parallel appendages 88 which depend therefrom and are slotted at 90 to receive opposed studs 92 extending from a slide 94 carried by a horizontal slide rod 96 suspended by a pair of brackets 98. An L-shaped pusher 100 is secured to the front face of slide 94 and hence moves with slide 94 toward and away from an access station 102 shown in phantom lines and comprising a platform which forms a part of the cabinet (not shown) of the dispensing apparatus.

A plate-like gate 104 is carried by the upper end of a crank arm 106 received in a pair of apertured, vertically spaced flanges 108 projecting forwardly from the front margin of panel 40. Arm 106 is vertically reciprocable in flanges 108 by virtue of a depending extension 110 forming the lower end of arm 106 which connects with a crank 112 rigid with the forward end of shaft 16.

Automatic shelf unfolding and refolding

Conveyor 10 moves in a clockwise direction as viewed in FIG. 3; therefore, operation thereof will shift lowermost shelf 18 to a position where inclined element 116, rigidly attached to the mechanism supporting chassis 118, will come into contact with a laterally extending flange 120 projecting from one edge of the outer section 28 of each shelf 18. Flange 120 forms a part of outer section 28 only, but extends over the axis defined by hinge structure 32 to present a margin 122 for engaging inclined element 116. This causes the shelf to partially open against the bias of spring 34.

A finger 124 is attached to the base of chassis 118 by a pivotal connection 126 and biased in a clockwise direction, as viewed in FIG. 3, by a spring 128. A stop 130 limits swinging movement of finger 124 toward the lowermost shelf 18, the finger being provided with a hooked free extremity 132 which is engaged by the lip 30 of each shelf 18 after partial unfolding thereof by element 116. Interengagement of extremity 132 and lip 30 causes complete unfolding of the shelf as the conveyor is advanced, the shelf then being maintained in the unfolded condition by the action of its leaf spring 38.

Refolding of each shelf 18 is effected by an elongated projection 134 secured to a horizontally extending plate 136 rigid with panel 40. As is clearly illustrated in FIG. 4, projection 134 extends inwardly toward the shelf 18 aligned with access station 102, and terminates in proximal, overlying relationship to the flange 120 extending from the outer section 28 of the shelf. Upon upward movement of the open shelf 18 shown in FIG. 4, the flange 120 thereof will be brought into engagement with the lowermost tip of projection 134 to effect reclosing thereof.

Operation

Electric motor 48 may be controlled by any of a variety of conventional circuit arrangements commonly utilized in dispensing apparatus of this general type. However, in the instant invention, of course, circuitry for synchronizing the action of separate conveyor and pusher motors is not required since all of the functions of the apparatus are under the control of the single motor 48.

By way of example, a product-responsive switch may be disposed on platform 102 such that the switch will be held in an open position by the presence of a product on the platform. In FIG. 3, a normally closed switch 138 is shown having an actuator arm 140 which is operated by pin 58. In FIGS. 1, 2, 3 and 6, the apparatus is shown in the stand-by condition with pin 58 depressing actuator arm 140 to hold the internal contacts of switch 138 open. Thus, by connecting switch 138 and the product-responsive switch on platform 102 in separate, parallel motor control circuits, it will be seen hereinafter that motor 48 is caused to effect one cycle of machine operation each time a consumer removes a product from platform 102. This operational cycle effects restocking of the platform and moves a loaded shelf 18 into a position for subsequent product dispensing the next time a product is removed from the platform.

Normally open push button switch 142 parallels switch 138 to facilitate operation of the conveyor by maintenance and service personnel.

Assuming that the components of the apparatus are in their stand-by positions as illustrated by FIGS. 1, 2, 3 and 6, and that a product is disposed on platform 102, operation of conveyor 10 is initiated by removal of the product from the platform. Such removal permits closure of the product-responsive switch to, in turn, initiate operation of motor 48.

Operation of motor 48 effects rotation of shaft 50 and Geneva gear 52 in a counterclockwise direction as viewed in FIG. 3, or a clockwise direction as viewed in FIG. 6, as indicated by the arrows. During the initial 1/6 of a revolution, pinion 54 is in mesh with Geneva gear 52 to effect rotation of conveyor sprocket shaft 16 to, in turn, advance the conveyor. Conveyor advancement causes upward movement of the left-hand stretch of the conveyor and downward movement of the right-hand stretch thereof, as viewed in FIG. 3.

Figure 2:
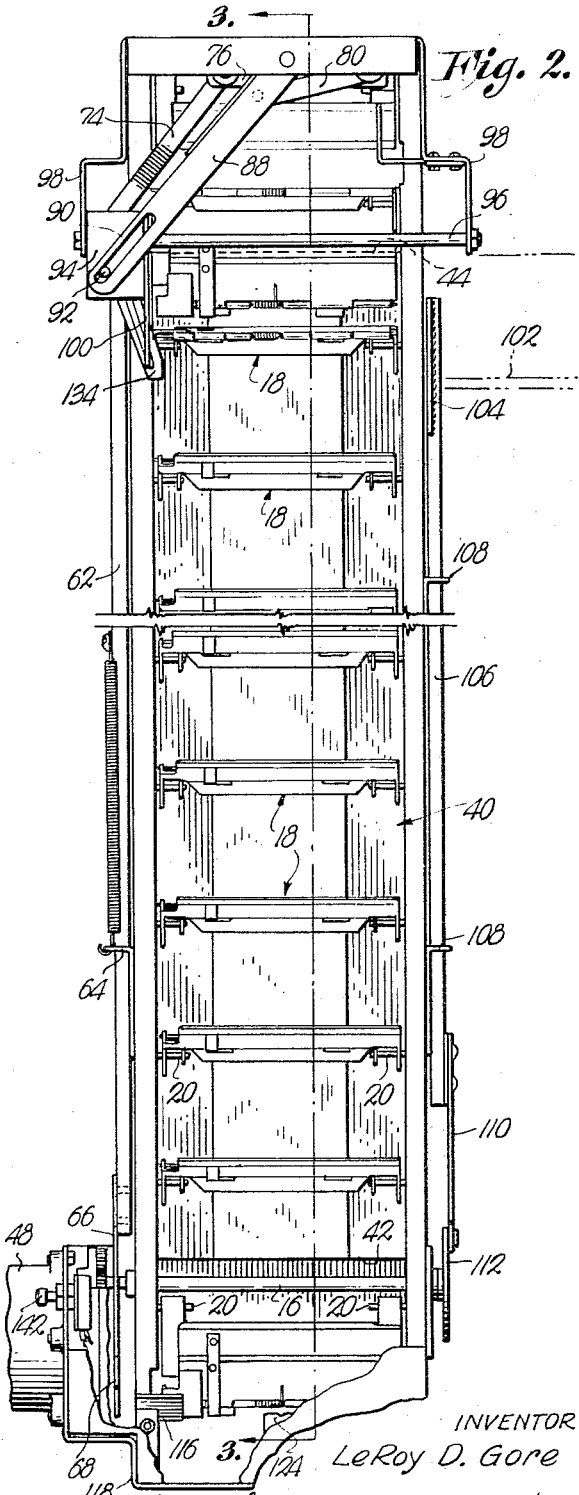
FIG. 2 is a side elevational view of the mechanism.

FIGURE 2 clearly illustrates that none of the shelves 18 are in horizontal alignment with platform 102 when the machine is in its stand-by condition. Therefore, an initial conveyor displacement is needed to bring the next shelf 18 into horizontal alignment with platform 102.

FIGURE 4 shows the position of a shelf 18 after the first 1/6 of a revolution of Geneva gear 52. The shelf 18 now has completed its movement along the delivery path and is at the dispensing location where the operation of pusher 100 will slide the product off of the shelf and onto platform 102. Pusher operation is effected by engagement of cam 58 with the lowermost edge of leg 68 of follower member 62, which engagement occurs subsequent to the initial 1/6 of a revolution discussed above.

In FIG. 3 it may be seen that, when pin 58 moves into engagement with leg 68, the leg will be raised by continued rotation of Geneva gear 52 until pin 58 reaches a zenith position where it moves out of engagement with leg 68. During nearly 1/2 of a revolution of gear 52, follower member 62 is being raised by pin 58 to, in turn, shift pusher 100 from the position shown in FIG. 2 to the position shown in FIG. 4. Manifestly, it pushes the product on the shelf 18 aligned with platform 102 off of the shelf and onto the platform to restock the same.

It will be appreciated that restocking of the platform necessarily effects reopening of the product-responsive switch thereon. Operation of motor 48 continues, however, since pin 58 has moved out of contact with actuator arm 140 thereby permitting closure of the internal contacts of switch 138. Thus, motor 48 will continue operation until pin 58 once again reaches its stand-by position and depresses arm 140.

As follower member 62 is shifted vertically upwardly, arm 74 drives block 76 rightwardly, as viewed in FIGS. 2 and 4, to, in turn, shift link 80 therewith and effect swinging movement of appendages 88. This forces slide 94 to the right along rod 96 by virtue of the sliding engagement of studs 92 in slots 90. Thus, pusher 100 is shifted across the upper surface of the shelf to transfer the product thereon to platform 102. During pusher operation, shoe 56 slidably engages the locking rib 60 on Geneva gear 52 to lock conveyor 10 against movement and maintain stationary the shelf 18 at the dispensing location.

As pin 58 moves from beneath leg 68 of follower member 62, spring 70 returns follower member 62 to the stand-by position, thereby withdrawing pusher 100 and returning the same to the position illustrated in FIG. 2. The teeth of Geneva gear 52 then engage pinion 54 and effect rotation of shaft 16 until pin 58 contacts actuator arm 140, during which time the conveyor is again advanced to ultimately leave shelves 18 in the positions illustrated in FIG. 2.

The diameter of pinion 54 and the number of teeth on Geneva gear 52 are selected such that the pinion makes one revolution during each operational cycle of the apparatus. Since crank 112 is connected to shaft 16, the crank also makes one revolution during each operational cycle to, in turn, reciproctae gate 104 via crank arm 106. The interconnection between crank 112 and its arm 106 is arranged such that gate 104 is withdrawn to the open position (FIG. 4) during pusher operation in order to permit dispensing of the product, and is then raised into blocking relationship to the product compartment thereafter. Gate 104 prevents consumer access to the compartment and also serves to limit the escape of temperature controlled air from the compartment if the apparatus is utilized to dispense heated or refrigerated food products.

As the shelves 18 are sequentially moved away from the dispensing location and along the return path to the bottom end of the conveyor, the laterally extending flange 120 of each shelf is brought into engagement with the lowermost tip of projection 134. It may be noted in FIG. 5 that the right-hand edges, as viewed in this figure, of the inner and outer sections 22 and 28 are offset, the length of the inner section 22 being somewhat greater than the length of the outer section 28. One corner of the inner section 22 is also cutaway as at 144 to provide a notch aligned with the offset edge of outer section 28. This arrangement provides clearance for the tip of projection 134 as the same engages the margin 122 of flange 120 in the notch defined by cutout 144 to swing the outer section 28 of the now empty shelf upwardly about hinge structure 32 a sufficient distance to move leaf spring 38 around the end of tab 36, whereupon spring 34 then completes the refolding operation.

The folded shelves subsequently retract as the flanges 24 thereof ride over the top of edge 44 of panel 40. The shelves then hang from their supporting pins 20 during the remainder of return movement back to the storage zone of the apparatus.

Unfolding of each shelf as the same leaves the lowermost elevation of conveyor 10 is described hereinabove. Finger 124 swings in a counterclockwise direction as viewed in FIG. 3 as it is engaged by the shelf, but the restoring force of spring 128 is sufficiently large to maintain tight interengagement between extremity 132 of the finger 124 and lip 30 of the shelf 18. Thus, as each shelf 18 commences upward movement and enters the product storage zone, the outer section 28 thereof is pulled into a horizontal position by extremity 132, whereupon leaf 38 of the shelf maintains the latter in the unfolded condition. Thus, products may be loaded on the extended shelves 18 by a one-hand operation since manual unfolding of the shelves is obviated.

Having thus described the invention, what is claimed as new and desired to be secured by Letters Patent is:

1. In a dispensing machine:
   a conveyor having a transport member and a plurality of foldable, product-receiving shelves carried by the member,
   each of said shelves having a first section coupled with said member and a second section normally folded on the first section;
   drive means coupled with said conveyor for shifting the latter to sequentially move said shelves to a product storage zone;
   structure disposed to automatically unfold each shelf as the latter is moved toward said zone by said drive means;
   said drive means being operable to move said shelves along a delivery path from said zone to a dispense location, and thence along a return path to said zone;
   means in said return path for automtaically refolding each shelf as the latter is moved away from said location by said drive means; and
   said refolding means including a projection disposed for engagement by the second section of each shelf to effect said refolding thereof.

2. The invention of claim 1,
   each shelf having means swingably attaching its second section to its first section,
   said projection being disposed to cause swinging of the second section of each shelf toward the first section thereof upon engagement by each of said second sections,
   each shelf being provided with biasing means operable to shift its second section to the normal disposition thereof folded on the respective first section upon said swinging of the second section by said projection.

3. In a dispensing machine:
   a conveyor having a transport member and a plurality of foldable, product-receiving shelves carried by the member,
   each of said shelves having a first section coupled with said member and a second section normally folded on the first section;
   drive means coupled with said conveyor for shifting the latter to sequentially move said shelves to a product storage zone;
   structure disposed to automatically unfold each shelf as the latter is moved toward said zone by said drive means;
   each shelf being provided with means biasing its second section toward the normal disposition thereof folded on the respective first section, and means releasably maintaining the shelf in its unfolded condition against the action of said biasing means upon unfolding of the shelf by said structure.

4. In a dispensing machine:
   a conveyor having a transport member and a plurality of foldable, product-receiving shelves carried by the member,
   each of said shelves having a first section coupled with said member and a second section normally folded on the first section;
   drive means coupled with said conveyor for shifting the latter to sequentially move said shelves to a product storage zone;
   structure disposed to automatically unfold each shelf as the latter is moved toward said zone by said drive means;
   said structure being engageable with the second section of each shelf to effect said unfolding thereof;
   each shelf having means swingably attaching its second section to its first section;
   each of said second sections having a lip remote from the respective first section when unfolded therefrom; and
   said structure including an element engageable by the section of each shelf during said movement thereof to swing the same away from the respective first section to partially unfold the shelf, and means disposed for engagement by the lip of each shelf after said partial unfolding to effect complete unfolding thereof as the shelves are moved through a predetermined displacement by said drive means.

References Cited by the Examiner
UNITED STATES PATENTS

| | | | |
|---|---|---|---|
| 988,822 | 4/1911 | Rossin | 198—158 |
| 1,133,565 | 3/1915 | Kankkonen | 198—158 X |
| 1,793,062 | 2/1931 | Collier | 198—158 |
| 2,680,052 | 6/1954 | Delf | 221—78 X |
| 3,012,653 | 12/1961 | Schramm | 198—158 |
| 3,204,752 | 9/1965 | Conner | 198—21 X |

FOREIGN PATENTS 512,358   7/1939   Great Britain.

EVON C. BLUNK, *Primary Examiner.*

M. L. AJEMAN, *Assistant Examiner.*